Aug. 13, 1929.   M. E. ANDERSON   1,724,063

COMBINED INFLATING AND DEFLATING VALVE

Filed Sept. 13, 1927

Inventor

Martin E. Anderson

Patented Aug. 13, 1929.

1,724,063

UNITED STATES PATENT OFFICE.

MARTIN E. ANDERSON, OF DENVER, COLORADO.

COMBINED INFLATING AND DEFLATING VALVE.

Application filed September 13, 1927. Serial No. 219,218.

This invention relates to improvements in devices for use in inflating automobile tires to a predetermined pressure.

It is the object of this invention to produce a device that will facilitate the operation of inflating automobile tires with air.

It is a still further object to produce a device that can be used for deflating a pneumatic tire to a desired pressure from a higher pressure.

Figure 1:
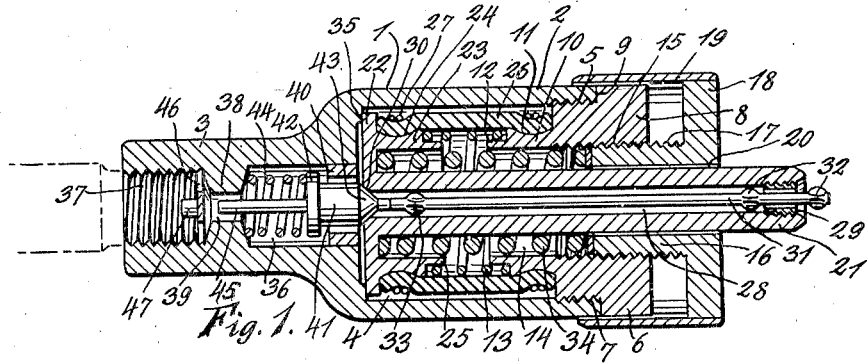
Figure 2:
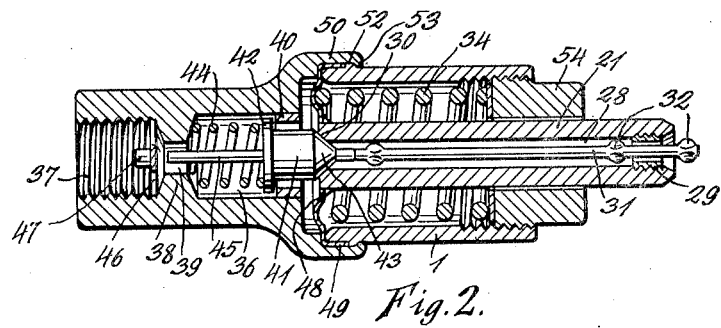

The above and other objects that may appear as the description proceeds are attained by means of a construction and an arrangement of parts that will now be described in detail, reference for this purpose being had to the accompanying drawing in which the preferred embodiment of the invention has been illustrated and in which:

Fig. 1 is a diametrical longitudinal section through one embodiment of the invention; and Fig. 2 is a section similar to that shown in Fig. 1 but which shows a slightly modified construction.

In the drawing numeral 1 represents the body member of the preferred embodiment of the invention. This member has been shown as consisting of two concentric cylindrical sections 2 and 3 of unequal diameters. Section 2 has a cylindrical opening 4 whose outer end is provided with internal threads 5. A tubular plug 6 is provided with a threaded section 7 that cooperates with the threads 5, and has a cylindrical portion 8 of somewhat greater diameter whereby a shoulder 9 is formed that fits against the end of the cylindrical section 4. The inner end of plug 6 has an extension 10 whose outer surface is concave or provided with a groove 11. This extension terminates in a cylindrical portion 12 on which rests one end of spring 13. Plug 6 has an axial opening 14 whose outer end is threaded in the manner indicated at 15. A plug 16 is provided with exterior threads 17 that cooperate with the threads 15 in opening 14. Plug 16 may be provided with a flange 18 of substantially the same diameter as plug 6 and carries a sleeve 19 whose edge may be provided with graduations (not shown.) Plug 16 has an axial opening 20 within which is slidably mounted the tubular stem 21. The inner end of stem 21 is provided with a circular end portion or head 22 whose diameter is slightly less than that of opening 4. Head 22 is provided with a circular projection 23 whose outer surface has a concave groove 24 similar to groove 11 on the opposing projection 10. Projection 23 terminates in a cylindrical portion 25 that corresponds to part 12 and which supports one end of spring 13. A rubber tube 26 has its ends secured to the grooved surfaces 11 and 24 on parts 10 and 23 by means of cords 27. Stem 21 has an axial opening 28 whose outer end has been threaded for the reception of a threaded sleeve 29 and has its inner end provided with a valve seat 30. A rod 31 extends through the opening 28; this rod has two spaced projections 32 on opposite sides of sleeve 29 which limit its movement both inwardly and outwardly and is provided near its other end with centering lugs 33. A spring 34 surrounds the stem 21 and has one end abutting the inside of head 22 while its other end abuts the inner end of the tubular plug 16. Spring 34 is under compression and exerts a force tending to move the head 22 towards the annular seat 35. By turning plug 16 the force exerted by spring 34 can be adjusted to any extent desired.

The cylindrical section 3 has a cylindrical recess 36 that forms an extension of the opening 4. The outer end of section 3 has an internally threaded opening 37 that is adapted to be threaded onto the outer end of a valve stem such as has been indicated by dotted lines in Fig. 1. An internal flange 38 separates the opening 36 from the threaded opening 37 and this flange or partition has a central opening 39.

A ring 40 is secured to the inside of opening 36 and is held in place by friction or it may be threaded if desired. A valve 41 has one end provided with a flange 42 and has the other end provided with a valve seat 43 that is adapted to cooperate with the seat 30 so as to form an air tight joint. A spring 44 is located between the end of the valve and the flange 38 and tends to move flange 42 against the ring 40 a guide rod 45 is preferably attached to the valve and extends into the opening 39. A plate 46 that has a central plug 47 is preferably secured in the bottom opening 37. The plug 47 serves to open the valve in the valve stem. Plate 46 can be dispensed with however, and the end of the guide rod 45 used for opening the valve in the valve stem.

The valve 41 that has been shown and described is merely intended to illustrate a check valve in a general way and in actual practice a valve like those now employed in automobile tire valve stems can be used. It will be observed that the stem 21 can move outwardly for some distance without interfering with the seating of the check valve which is held seated by the action of the spring 44 until the flange 42 engages ring 40. This range of movement can be made much longer than shown in the drawing.

Let us now assume that the parts are assembled as above described and as shown in Fig. 1 and let us also assume that the device is connected to the outer end of a tire valve stem like that shown by dotted lines. The plug 47 will open the valve in the valve stem and this permits the air pressure if any exists, within the tire, to be communicated to the head 22. The pressure exerted on head 22 tends to move it against the force exerted by spring 34. If the pressure is sufficiently great it will move the head 22 until the flange 42 of the valve engages the ring 40 after which any further movement will unseat the valve and permit the tire to deflate.

If the pressure in the tire is low air is admitted by applying the chuck on the outer end of a compressed air hose to the outer end of stem 21. When the chuck is applied pressure is exerted on the outer end of bar 28 and this opens the check valve thereby permitting air to flow into the tire. When the operator believes that he has as high a pressure in the tire as he desires he removes the chuck from the end of the stem. If deflation takes place he merely waits until the pressure has been decreased sufficiently to cause the check valve to close and then removes the device. If no air escapes through stem 21 more air is forced into the tire. It is, of course, understood that the tension of spring 34 is adjusted so that the check valve will close when the tire has deflated to the pressure desired. By turning plug 16 the value of the pressure required to open the check valve can be adjusted to any extent desired.

In Fig. 2 I have shown a modification of the construction above described in which a diaphragm 48 is secured to the inner end of the stem 21 in any suitable way such as by being brazed or welded to it. The outer edge of this diaphragm has been shown as provided with a cylindrical flange 49 that is located between the inside of the cylindrical flange 50 and the outer surface of the inner end of the cylindrical sleeve 51. This sleeve has an annular projection 52 against which the end 53 of part 50 is pressed so as to hold the parts in assembled position. A plug 54 has a threaded engagement with sleeve 51 and serves as a means for adjusting the tension of the spring 34. The diaphragm 48 may be made of metal, as shown, or of any flexible air tight material such as rubber.

The devices shown in Figs. 1 and 2 and which have just been described are not intended to serve as pressure gages in the ordinary way but it is desirable to graduate the stems so that the pressure can be read.

It is also possible to increase the range of the movement by increasing the lost motion connection between ring 40 and flange 42 to any extent desired but this is not considered to be necessary when the device is used as a deflating valve.

Attention is directed to the fact that the valve member 41 is located in a recess in the end closure and that is urged inwardly by means of a spring 44. The inward movement of valve member 41 is limited by the flange 42 engaging the ring 40. When the parts are in normal position flange 42 is moved away from ring 40 a short distance so that the valve will follow the valve seat for a short distance as the latter is moved outwardly by the pressure. This lost motion connection makes it possible to obtain better results than if the valve member were stationary as the unseating of the valve will take place while the valve seat is balanced between the spring pressure and the pressure of the air. Another advantage of this lost motion connection is that by this means the device can be used to indicate pressures below that for which the valve is adjusted in the manner heretofore pointed out. Another advantage of the lost motion connection of the valve with the end closure is that it permits the valve to be opened during inflation by merely exerting a pressure on it by means of the rod 31.

I claim:

1. A device for use in inflating and then deflating an automobile tire comprising, in combination, a body member having an opening extending therethrough, one end of said opening being cylindrical and of larger diameter than the other end, the bottom of the larger opening terminating in a cylindrical recess of smaller diameter, a spring located in the cylindrical recess, a valve member having one end in engagement with the spring and the other end extending into the larger opening, means for limiting the movement of the valve member in the direction of the larger opening, a plunger mounted for movement in the opening, said plunger having an opening extending therethrough, a valve seat in the opening adapted to be engaged by the valve member, an air tight flexible partition connecting the plunger with the inside of the larger opening so as to form an air chamber with which the opening in the plunger communicates and resilient means for urging the plunger inwardly.

2. A device for use in inflating and then deflating an automobile tire comprising, in combination, a body member having an opening extending therethrough, one end of said opening being cylindrical and of larger diameter than the other end, the bottom of the larger opening terminating in a cylindrical recess of smaller diameter, a valve operating member having a portion thereof extending into the recess, means associated with the wall of the recess and with the valve operating member for limiting the outward movement of the latter, a valve carried by the valve operating member, a plunger mounted for movement in the opening, said plunger having an axial opening extending therethrough, a valve seat in said axial opening, a tubular plug located in the enlarged opening, a portion of the plunger extending through the opening in the plug, means comprising a spring for urging the plunger inwardly, means for limiting the inward movement of the plunger, resilient means for urging the valve against the valve seat, a flexible air tight partition connected with the plunger and with the inside of the body member and dividing the interior thereof into an air tight chamber with which the inner end of the opening in the plunger communicates and means for reenforcing the partition so that it will resist the action of the air pressure.

In testimony whereof I affix my signature.

MARTIN E. ANDERSON.